United States Patent
Chen et al.

(10) Patent No.: US 12,352,584 B1
(45) Date of Patent: Jul. 8, 2025

(54) MANUAL ROUTE START

(71) Applicant: Samsara Inc., San Francisco, CA (US)

(72) Inventors: Xin Chen, New York, NY (US); Eric Shreve, Calistoga, CA (US); Tirso Peguero, San Francisco, CA (US); Sean McGee, San Francisco, CA (US); Hendrika Makilya, El Cerrito, CA (US); Matthew Morales, Ventura, CA (US); Emily White, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 62 days.

(21) Appl. No.: 17/811,043

(22) Filed: Jul. 6, 2022

Related U.S. Application Data

(60) Provisional application No. 63/365,994, filed on Jun. 7, 2022.

(51) Int. Cl.
*G01C 21/34* (2006.01)
*G01C 21/36* (2006.01)

(52) U.S. Cl.
CPC ....... *G01C 21/3415* (2013.01); *G01C 21/343* (2013.01); *G01C 21/3626* (2013.01)

(58) Field of Classification Search
CPC .............. G01C 21/3415; G01C 21/343; G01C 21/3626
See application file for complete search history.

(56) References Cited

U.S. PATENT DOCUMENTS

| | | | |
|---|---|---|---|
| 2011/0098915 A1* | 4/2011 | Disatnik | G01C 21/3415 701/533 |
| 2016/0180274 A1* | 6/2016 | Zwakhals | G06Q 10/06315 705/7.25 |
| 2018/0172463 A1* | 6/2018 | Morales | H04L 67/131 |
| 2018/0192243 A1* | 7/2018 | Cornwall | H04W 4/022 |
| 2022/0391837 A1* | 12/2022 | Martin, Jr. | G06Q 10/06311 |
| 2023/0188927 A1* | 6/2023 | Paul | G16Y 40/60 701/482 |

* cited by examiner

*Primary Examiner* — Faris S Almatrahi
*Assistant Examiner* — Selena M Jin
(74) *Attorney, Agent, or Firm* — Schwegman Lundberg & Woessner, P.A.

(57) ABSTRACT

Disclosed are systems, methods, and non-transitory computer-readable media for manually starting routes. A route management system provides for accessing a route tracking report associated with a vehicle to identify a plurality of routes associated with the vehicle; generating, for display, a first route identifier associated with a first route and a second route identifier associated with a second route, the first route being in an active route state and the second route being in a scheduled route state; receiving a request to manually start the second route associated with the second route identifier; and in response to receiving the request, transitioning the second route from the scheduled route state to the active route state to begin tracking a first set of stops associated with the second route instead of a second set of stops associated with the first route.

20 Claims, 11 Drawing Sheets

MANUAL ROUTE START

PRIORITY APPLICATION

This application claims priority to U.S. Patent Application Ser. No. 63/365,994, filed Jun. 7, 2022, the disclosure of which is incorporated by reference herein in its entirety.

TECHNICAL FIELD

Embodiments of the present subject matter relate generally to vehicles and, more specifically, to previewing various routes.

BACKGROUND

Fleet managers track the movement of their vehicles to ensure that they are operating as expected. For example, fleet managers may track whether a vehicle began a route at an expected time, arrived at scheduled stops along the route, and completed the route. This process is often performed manually; however, systems have been developed to automate this process. These systems utilize geofences to determine when a vehicle has arrived and/or departed a scheduled stop. In some cases, a vehicle may be scheduled to stop at multiple locations that are within a proximity of each other. For example, a delivery truck may be scheduled to deliver packages at multiple stores located in the same shopping center.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
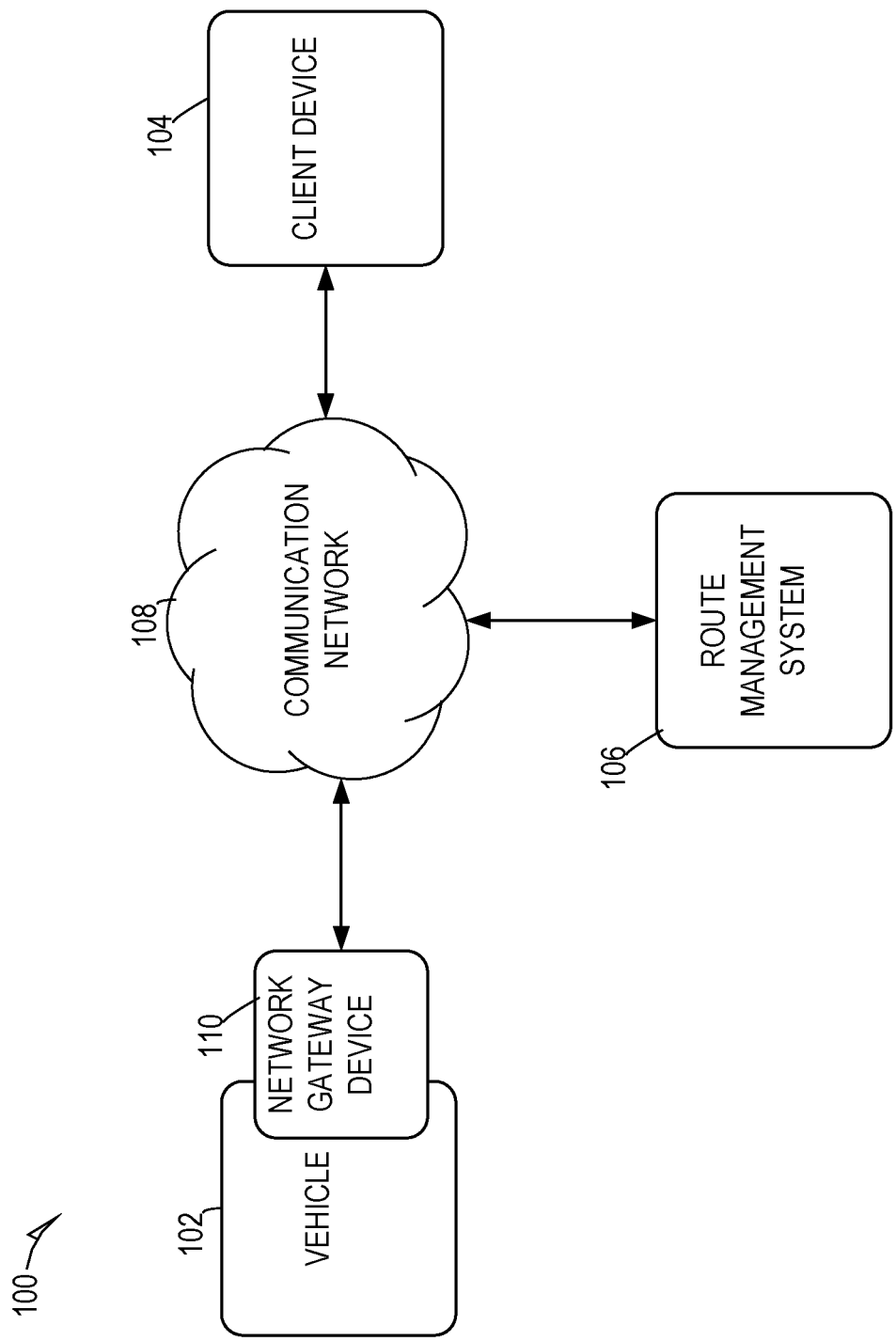
FIG. 1 shows a system for manually starting assigned routes, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations. Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment and the embodiments can be combined with each other.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for manually starting routes assigned to a vehicle and/or driver. A route management system provides for manually starting assigned routes. For example, the route management system enables fleet managers to define and assign multiple routes for vehicles in a fleet. A route may be defined based on a set of route variables that describe the route. For example, the set of route variables may include a beginning and ending location of the route, scheduled stops along the route each associated with a geographical location, an order at which the vehicle is to stop at each scheduled stop, a scheduled beginning and ending time of the route, a scheduled arrival and departure time at the scheduled stops, the amount of time the vehicle remains stopped at an individual stop or location, and the like. In some cases, drivers can pick and choose which routes the drivers would like to drive and in other cases the order of the routes is determined by the fleet manager.

The route management system uses the set of route variables defining each route along with sensor data describing the geographic location and/or movement of the vehicles to generate route tracking reports. A route tracking report is a file or document that includes data indicating the movement of a vehicle in relation to its assigned route. For example, the route tracking report may indicate whether a vehicle began and/or ended its route on time, arrived at each of its scheduled stops, arrived and/or departed from each scheduled stop on time, completion status of each stop (e.g., whether the stops are in a completed state or incomplete state), completed the route in the correct order, the list of stops and their associated locations remaining on the route, and the like. The route tracking report can also include historical information that identifies previously completed/assigned routes, routes that are currently assigned, and assigned routes scheduled for completion in the future (at a later time on a same day as another route or on a different day).

Geofences are used to determine when vehicles have arrived and/or departed from scheduled stops along a route. A geofence is a virtual perimeter for a real-world geographic area. Geofences are established to encompass each scheduled stop along a route. The route management system uses the geofences along with location data describing the current location of the vehicles to determine whether the vehicles have arrived and/or departed the scheduled stops. For example, the route management system may determine that a vehicle has arrived at a scheduled stop if the current location of the vehicle has been within the geofence encompassing the scheduled stop for a threshold period of time. Similarly, the route management system may determine that the vehicle has departed the scheduled stop if the current location of the vehicle is subsequently outside of the geofence encompassing the scheduled stop for another threshold period of time. The route management system can then use the information indicating that the vehicle has departed from the scheduled stop to compute or update one or more ETAs for one or more subsequent stops along the route. The route management system can automatically mark or set a stop to a completed state in response to determining that a location of the vehicle has reached or entered the geofence of the stop.

Problems arise with current systems when multiple routes are assigned to the same vehicle or driver. Current systems typically present assigned routes to a driver in a small 5-day calendar view. Such views are usually disorganized, and it can be difficult to discern a status of the routes and to identify which routes have previously been completed. The result of this is a low customer satisfaction and missed sales opportunities. This makes it very difficult for drivers to plan their days and to decide to take on certain routes early. For example, a driver may be in the middle of driving or completing stops along a route and may find that stops of another route can be completed earlier. However, because the current route in progress needs to be completed before stops of another route begin being tracked, the driver is discouraged from completing stops of the other route.

There is no seamless and straightforward mechanism for drivers to switch to driving other routes that are assigned to them. To switch routes, drivers typically need to call a dispatch to have routes re-assigned and/or navigate through multiple pages of information to modify the system configuration to stop driving one route and start driving another route. This ends up frustrating the drivers and the drivers may be discouraged from driving or navigating routes in an efficient manner. Also, drivers that do navigate through the multiple pages of information to navigate other routes waste system resources that can be dedicated to other tasks.

To alleviate this issue, the route management system provides for a graphical user interface (GUI) that simplifies navigation through assigned routes to seamlessly switch from navigating or driving one active route to navigating another route that is scheduled for being driven in the future. For example, the route management system accesses a route tracking report associated with a vehicle to identify a plurality of routes associated with the vehicle. The route management system generates, for display, a first route identifier associated with a first route and a second route identifier associated with a second route. The first route can be in an active route state and the second route can be in a scheduled route state. The route management system receives a request to manually start the second route associated with the second route identifier. The route management system, in response to receiving the request, transitions the second route from the scheduled route state to the active route state to begin tracking a first set of stops associated with the second route instead of a second set of stops associated with the first route.

By providing an easy-to-use GUI for manually starting assigned routes (e.g., switching from having one route tracked to another), drivers are better equipped to manage their deliveries and personal time. Also, the amount of pages of information that a driver needs to navigate through is reduced, which makes operating the system more efficient and reduces the amount of resources needed to accomplish a task. Specifically, the disclosed systems improve a driver's experience by providing them more flexibility into which assigned routes are being driven and tracked. The disclosed systems also improve over-the-road driver retention by allowing such drivers to make personal plans around their assigned trips. This improves the operational efficiency of the route management system by reducing call volumes between drivers and dispatchers, alleviating the dispatchers' burden and enabling them to handle other tasks.

FIG. 1 shows a system 100 for manually starting assigned routes. As shown, multiple devices (i.e., vehicle 102, client device 104, and route management system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, a wearable device, a watch, or a portable computing device, such as a laptop, smart phone, or a tablet personal computer (PC). A computing device can include some or all of the features, components, and peripherals of the machine 900 shown in FIG. 9.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The vehicle 102 may be any type of vehicle, such as an automobile, bicycle, motorcycle, skateboard, semi-trailer truck, plane, bus, train, ship, a vessel, and the like. As shown, the vehicle 102 includes a network gateway device 110 (e.g., vehicle gateway) that allows for remote communication between the vehicle 102 and one or more remote computing devices via the communication network 108.

The network gateway device 110 is a hardware device that acts as a gate to a network and enables traffic to flow in and out of the network to other networks. For example, the network gateway device 110 can be established as an edge device of a network or system of nodes within the vehicle 102 (e.g., vehicle networking system). For example, the network or system of nodes may include a variety of sensors, computing devices (e.g., electronic control units (ECUs)), actuators, etc. deployed within the vehicle 102. The network gateway device 110 facilitates wireless communication capabilities by connecting to wireless networks (e.g., cellular, wireless local area network, satellite communication networks, etc.), for purposes of communicating with remote computing devices. The network gateway device 110 may also provide additional functionality, such as firewall functionality by filtering inbound and outbound communications, disallowing incoming communications from suspicious or unauthorized sources, etc.

Use of the network gateway device 110 allows for a remote computing device to transmit data and/or commands to the vehicle 102. Similarly, the network gateway device 110 allows for the vehicle 102 to transmit data, such as sensor data gathered by sensors of the vehicle 102, to a remote computing device. The vehicle 102 may be equipped with a variety of sensors that capture data describing performance of a vehicle 102 and its surroundings. For example, the sensors may include engine speed sensors, fuel temperature sensors, voltage sensors, pressure sensors, radar sensors, location sensors, global positioning system (GPS) sensors that provide a current geographical location of the vehicle 102, light detection and ranking (LIDAR) sensors, imaging sensors (e.g., camera, video camera), and the like.

The route management system 106 is one or more computing devices that allow for generation and management of routes as well as automated route tracking. For example, the route management system 106 may allow administrators to generate routes and assign the generated routes to vehicles 102. The route management system 106 may also provide automated route tracking of the vehicles 102 based on the assigned routes. The route management system 106 may also enable operators, route managers, and drivers to access and view assigned past, present, and future routes.

To utilize the functionality of the route management system 106, users (e.g., fleet managers, drivers, or operators) may use a client device 104 that is connected to the communication network 108 by direct and/or indirect communication. Although the shown system 100 includes only one client device 104 and one vehicle 102, this is only for ease of explanation and is not meant to be limiting. One skilled in the art would appreciate that the system 100 can include any number of client devices 104 and/or vehicles 102. Further, the route management system 106 may concurrently accept communications from and initiate communication messages and/or interact with any number of client devices 104 and vehicles 102, and support connections from a variety of different types of client devices 104, such as desktop computers; mobile computers; mobile communications devices, e.g., mobile phones, smart phones, wearables, watches, glasses, tablets; smart televisions; set-top boxes; and/or any other network enabled computing devices. Hence, the client devices 104 may be of varying type, capabilities, operating systems, and so forth.

A user interacts with a route management system 106 via a client-side application installed on the client device 104. In some embodiments, the client-side application includes a component specific to the route management system 106. For example, the component may be a stand-alone application, one or more application plug-ins, and/or a browser extension. However, the users may also interact with the route management system 106 via a third-party application, such as a web browser or messaging application, that resides on the client device 104 and is configured to communicate with the route management system 106. In either case, the client-side application presents a user interface (UI) or GUI for the user to interact with the route management system 106. For example, the user interacts with the route management system 106 via a client-side application integrated with the file system or via a webpage displayed using a web browser application.

The UI of the client-side application can allow an end user to access and view assigned past, present, and future routes. For example, the UI of the client-side application can access a route tracking report associated with a vehicle to identify a plurality of routes associated with the vehicle. The client-side application can generate, for display, a GUI for navigating through the plurality of routes associated with the vehicle, the GUI including a plurality of time period options. The client-side application can receive input that selects a first time period option from the plurality of time period options. In response to receiving the input, the client-side application can retrieve a first set of routes from the plurality of routes that corresponds to the first time period option. The client-side application can update the GUI to display a first portion of the first set of routes in response to receiving the input.

In some examples, the GUI generates, for display, a first route identifier associated with a first route and a second route identifier associated with a second route, the first route being in an active route state and the second route being in a scheduled route state. The GUI can receive a request to manually start the second route associated with the second route identifier; and in response to receiving the request, the GUI can transition the second route from the scheduled route state to the active route state to begin tracking a first set of stops associated with the second route instead of a second set of stops associated with the first route. The UI or GUI of the client-side application is discussed in more detail in connection with FIGS. 5-7 below.

As discussed earlier, the route management system 106 enables fleet managers to generate and track vehicle routes. For example, the route management system 106 may provide a UI that allows fleet managers to generate vehicle routes. A vehicle route is a route to be traversed by a vehicle 102 that is defined by a set of route variables. For example, the set of route variables may include a beginning and ending geographic location of the route, scheduled geographic stops along the route, geographical locations of such stops or destinations, geofences associated with each stop or destination, scheduled amount of time to be spent at each stop before departing to a subsequent stop or destination, an order at which the vehicle 102 is to stop at each scheduled stop, a scheduled beginning and ending time of the route, a scheduled arrival and departure time at the scheduled stops, and the like.

In some examples, a vehicle 102 can be provided multiple routes each including a respective set of route variables. The multiple routes may include some of the same stops or destinations (e.g., stops or destinations may overlap between routes) or the multiple routes may include exclusively unique stops or destinations. A vehicle 102 may only traverse one route at a time. Namely, the vehicle 102 can drive along a selected route to each stop of the selected route and such stops are tracked for the selected route. Stops of other routes that have not been selected may not be tracked while the vehicle is navigating or driving along a selected route. For example, if two routes include a same particular stop or destination (e.g., include two stops with overlapping geofences), when the vehicle 102 reaches or crosses a geofence of the particular stop or destination associated with a first of the routes which is currently an active route (e.g., because the route was selected for navigation), the particular stop or destination is marked completed in association with the first of the routes but remains incomplete or scheduled in association with a second of the two routes.

The UI provided by the route management system 106 enables fleet managers to select the set of route variables to define a route. For example, the UI may provide a listing of geographic locations and times that a fleet manager may select from to define a route. A fleet manager may use the UI to select geographic locations to be included in the route, such as a beginning location, end location, geographical locations of such stops or destinations, geofences associated with each stop or destination, scheduled amount of time to be spent at each stop before departing to a subsequent stop or destination, and scheduled stops, as well as select an order in which the geographic locations are to be traversed along the route. The UI may also enable a fleet manager to assign times to the selected geographic locations, such as scheduled start time, arrival time, and/or departure time for each. The UI may also enable the fleet manager to select which route is currently active and which are inactive for a particular vehicle 102. The UI may also provide notifications or alerts associated with an active route indicating stops along the route and/or whether a vehicle 102 is early or late with respect to the scheduled arrival/departure time of one or more stops.

The UI may also enable fleet managers to assign the generated routes to individual vehicles 102 and/or vehicle operators or drivers. For example, the user interface may present a listing of individual vehicles 102 and/or vehicle operators from which the fleet manager may select. As another example, the UI may enable an administrator to enter data identifying a vehicle 102 or vehicle operator, as well as enter a new vehicle 102 or vehicle operator.

The route management system 106 provides for automated tracking of the vehicles 102 based on the routes assigned by the fleet manager. For example, the route management system 106 receives sensor data describing the current location and/or motion of the vehicle 102, which the route management system 106 uses to track location of the vehicle 102 and to compute/update estimated times of arrival (ETAs) of stops along the route. As referred to herein, the terms "stop," "destination," and "location" may be used interchangeably and may have the same meaning. The sensor data may be received from the vehicle 102 and/or from a client device 104 of the vehicle operator in real time or periodically.

The route management system 106 uses the set of route variables defining a route along with the sensor data describing the geographic location and/or movement of the vehicle 102 to generate a route tracking report describing the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like. The route tracking report may include some or all of the information of the route including the route variables.

In some examples, the route tracking report can include historical, current and future route information. Namely, the route tracking report can include information that identifies a list of routes previously assigned and completed or partially completed by a driver. The route tracking report can include currently assigned routes that are actively being driven and/or completed. The route tracking report can include routes assigned in the future to be driven at a future date. Such routes can include updates or changes which are tracked and stored by the route tracking report.

The route management system 106 uses geofences to determine when vehicles 102 have arrived and/or departed from scheduled stops along a route. A geofence is a virtual perimeter for a real-world geographic area. Geofences are established to encompass each scheduled stop along a route. The route management system 106 uses the geofences along with location data describing the current location of the vehicles 102 to determine whether the vehicles 102 have arrived and/or departed the scheduled stops. For example, the route management system 106 may determine that a vehicle 102 has arrived at a scheduled stop if the current location of the vehicle 102 has been within the geofence encompassing the scheduled stop for a threshold period of time. In such cases, the route management system 106 may mark or set the corresponding stop to a completed state. Similarly, the route management system 106 may determine that the vehicle 102 has departed the scheduled stop if the current location of the vehicle 102 is subsequently outside of the geofence encompassing the scheduled stop for another threshold period of time. The stops along a route can be navigated to sequentially or in any arbitrary order. Regardless of the order in which the stops are navigated to, the route management system 106 automatically sets a given stop of a given route to a completed state in response to determining that the given route is in the active route state and that the current location of the vehicle is within the geofence associated with the given stop.

Figure 2:
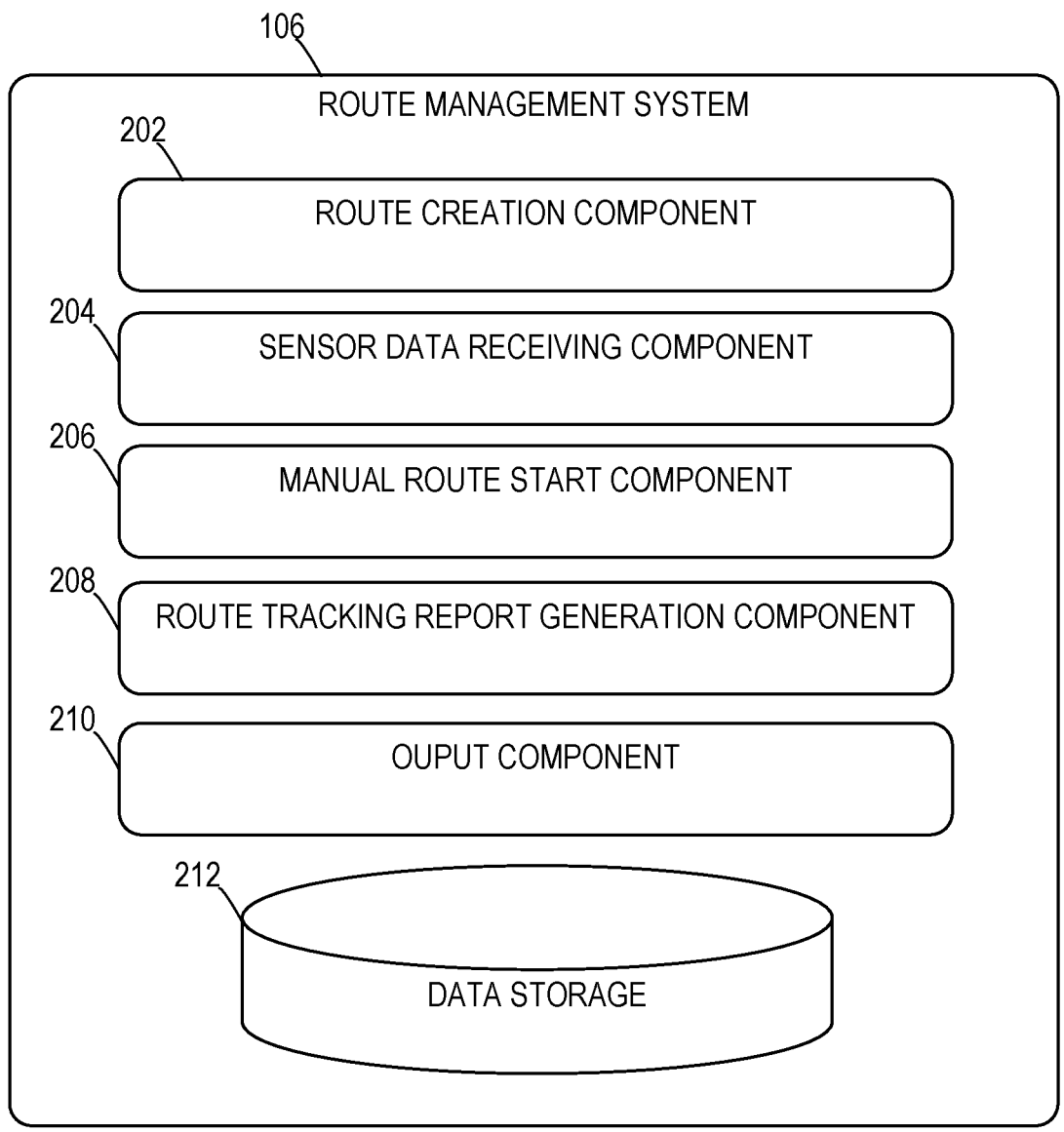
FIG. 2 is a block diagram of the route management system, according to some example embodiments.

FIG. 2 is a block diagram of the route management system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the route management system 106 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the route management system 106 includes a route creation component 202, a sensor data receiving component 204, a manual route start component 206, a route tracking report generation component 208, an output component 210, and a data storage 212.

The route creation component 202 enables fleet managers to generate routes and assign routes to vehicles 102. For example, the route creation component 202 may provide a UI that allows fleet managers to generate vehicle routes. A vehicle route is a route to be traversed by a vehicle 102 that is defined by a set of route variables, discussed above. For example, the set of route variables may include a beginning and ending geographic location of the route, scheduled geographic stops along the route, an order at which the vehicle 102 is to stop at each scheduled stop, a scheduled beginning and ending time of the route, a scheduled arrival and departure time at the scheduled stops, and the like. The route variables may also include geographical locations of such stops or destinations, geofences associated with each stop or destination, and/or scheduled amount of time to be spent at each stop before departing to a subsequent stop or destination. The route variables may be stored as part of a route tracking report in data storage 212.

The UI provided by the route creation component 202 enables fleet managers to select the set of route variables for a route. For example, the UI may provide a listing of geographic locations and times that a fleet manager may select from to define a route. A fleet manager may use the UI to select geographic locations to be included in the route, such as a beginning location, end location, and scheduled stops, as well as select an order in which the geographic locations are to be traversed along the route. The UI may also enable a fleet manager to assign times to the selected geographic locations, such as scheduled start time, arrival time, and/or departure time for each. The UI may also enable the fleet managers to specify geographical locations of such stops or destinations, geofences associated with each stop or destination, and/or scheduled amount of time to be spent at each stop before departing to a subsequent stop or destination.

The UI may also enable fleet managers to assign the generated routes to individual vehicles 102 and/or vehicle operators or drivers. For example, the user interface may present a listing of individual vehicles 102 and/or vehicle operators from which the fleet manager may select. As another example, the user interface may enable an administrator to enter data identifying a vehicle 102 or vehicle operator, as well as enter a new vehicle 102 or vehicle operator. The UI may also enable the fleet managers to specify which of a set of routes assigned to a given vehicle 102 is currently active and being tracked. In some examples, the UI can be presented to a driver to enable the driver to manually select which routes are currently active and/or to switch from one route being in the active state to another route being in the active state from a scheduled state. Tracking a route includes determining whether stops along the route have been completed or are scheduled for arrival. Stops that are being tracked can be used to generate ETAs of the corresponding stops.

As referred to herein, routes that are in the active state have their associated stops tracked for completion, such that when a geofence of a given one of the stops is broken or reached by the current location of the vehicle, the stop is marked or set to a completed state. Routes that are in the inactive, completed, or scheduled state do not currently have their stops tracked. In such cases, when the geofence of such routes is broken or reached by the current location of the vehicle, the corresponding stop remains in the scheduled, completed, skipped, or inactive state. In some examples, only one route at a time can be in the active state. In some examples, multiple routes can be in the active state simultaneously.

The route creation component 202 stores data defining the created routes in the data storage 212, where it can be accessed by other components of the route management system 106. For example, the data stored in the data storage 212 may be associated with an account of the route management system 106 and/or specific vehicles 102 to which the route has been assigned.

The sensor data receiving component 204 receives sensor data used to provide automated route tracking. For example, the sensor data receiving component 204 receives sensor data describing the current location and/or motion of a vehicle 102. The sensor data may be received from the vehicle 102 and/or from a client device 104 of the vehicle operator that is operating the vehicle 102.

The route tracking report generation component 208 generates a route tracking report for access by the manual route start component 206. The route tracking report describes the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like. The route tracking report may include information on routes tracked in the past for a vehicle 102, routes currently assigned to the vehicle 102, and routes assigned to the vehicle to be driven in the future. In some examples, the route tracking report includes route information for up to 30 days in the past and 30 days in the future, although other suitable time periods can be used.

The manual route start component 206 provides for the access and display of routes assigned to a vehicle 102 in the past, present, and future and for the option to manually start or resume certain routes. The manual route start component 206 uses the set of route variables defining a route along with the sensor data received by the sensor data receiving component 204 to track the vehicle's 102 movement along its assigned route and generate updates and status information for the past, present, and future routes. Specifically, the manual route start component 206 accesses a route tracking report associated with a vehicle to identify a plurality of routes associated with the vehicle. The manual route start component 206 generates, for display, a GUI for navigating and selecting between the plurality of routes associated with the vehicle.

The manual route start component 206 can generate, for display, a first route identifier associated with a first route and a second route identifier associated with a second route, the first route being in an active route state and the second route being in a scheduled route state. The first route identifier can be displayed in a region of a GUI associated with active routes and the second route identifier can be displayed in another region of the GUI associated with scheduled or inactive routes. The manual route start component 206 enables an operator to switch between a current active route and one or more scheduled routes to cause the current active route to enter the inactive state (in which stops associated with the route are not tracked) and the one or more scheduled routes to enter the active state (in which the stops of the route are tracked). In this way, an operator can seamlessly and easily switch or select which routes are in the active state and can have better control over their schedule to ensure deliveries are made on time.

In some examples, the manual route start component 206 enables the driver or operator to select a new route to be in the active state and move the currently active route to the inactive state in various ways. In particular, the manual route start component 206 can present a start route option together with the route identifier that is displayed in the scheduled routes region. Responsive to detecting selection of the start route option, the manual route start component 206 presents a confirmation screen or prompt informing the operator about which route is currently active (and the corresponding stops remaining on the current route) and informing the operator about which scheduled route has been selected to replace the currently active route. In response to receiving input from the operator confirming the operation to switch active routes, the manual route start component 206 automatically transitions the currently active route to the completed or inactive route state and transitions the selected scheduled route to the active route state.

For example, the manual route start component 206 can receive a request to manually start the second route associated with the second route identifier. The manual route start component 206, in response to receiving the request, can transition the second route from the scheduled route state to the active route state to begin tracking a first set of stops associated with the second route instead of a second set of stops associated with the first route. In some examples, the manual route start component 206 transitions the first route from the active route state to an inactive route state (e.g., a completed route state, a scheduled state, a skipped state, or other suitable state).

Another way in which the operator can switch active routes is by way of selecting a manually arrive option in association with a scheduled stop of a scheduled route. In particular, the manual route start component 206 can receive input that selects a given scheduled route. Responsive to the input, the manual route start component 206 can present a set of scheduled stops associated with the given scheduled route. The manual route start component 206 can receive a selection of one or more of the set of scheduled stops and can present, in response, a manually arrive option. In response to receiving a selection of the manually arrive option, the manual route start component 206 can set the one or more of the set of scheduled stops to the completed state and can provide a message or prompt with an option for the operator to confirm manual arrival at the one or more of the set of scheduled stops. The confirmation of the manual arrival can automatically transition the given scheduled route to the active route state and the currently active route to the completed or inactive route state. The message or prompt can inform the operator about which route is currently active (and the corresponding stops remaining on the current route) and which scheduled route has been selected to replace the currently active route.

The manual route start component 206 can instruct the route tracking report generation component 208 and/or any other component within the route management system 106 about the transition of the routes. Specifically, the manual route start component 206 can instruct the route tracking report generation component 208 and/or any other component within the route management system 106 to stop tracking stops associated with the currently active route and begin tracking stops associated with or included in the scheduled route that has been manually selected by the user to be started. In response, the route tracking report generation component 208 and/or any other component within the route management system 106 can retrieve the set of stops of the scheduled route and their respective geofences and can automatically begin setting the respective stops to the completed state in response to detecting overlap between a current location of the vehicle 102 and the corresponding geofences.

In some examples, the manual route start component 206 can prevent tracking stops associated with routes in the scheduled route state while tracking stops for the second route in the active route state. Specifically, the manual route start component 206 can determine that a current location of the vehicle has simultaneously entered two geofences, the two geofences including a first geofence associated with a first stop of the second set of stops of the first route and a second geofence associated with a second stop of the first set of stops of the second route. The manual route start component 206, in response to determining that the current location of the vehicle has simultaneously entered the two geofences, identifies which of the first and second routes is currently in the active route state. The manual route start component 206 sets the first stop to a completed state and maintains the second stop in a scheduled state in response to determining that the first route is in the active route state.

In some examples, the manual route start component 206 displays a GUI that includes an active routes region and a scheduled routes region. The first route identifier can be displayed in the active routes region while the first route is in the active route state. The second route identifier can be displayed in the scheduled routes region while the second route is in the scheduled route state. The manual route start component 206 can display a start route option in a portion of the scheduled routes regions associated with the second route, wherein receiving the request comprises detecting selection of the start route option. In response to receiving the request, the manual route start component 206 presents a prompt comprising a message that identifies the first route that is in the active route state and the second route that will be transitioned to the active route state. The manual route start component 206 receives, via the prompt, input that confirms transition of the second route to the active route state, the input comprising a selection of a start new route option.

In some examples, the manual route start component 206 identifies one or more stops of the first route that are incomplete. In response to identifying the one or more stops of the first route that are incomplete, the manual route start component 206 indicates in the message that the one or more stops of the first route will be set to a skipped state in response to receiving the input that confirms the transition of the second route to the active route state.

In some examples, the manual route start component 206, in response to receiving the input that confirms transition of the second route to the active route state, moves the second route identifier to the active routes region from the scheduled route region and moves the first route identifier from the active routes region to a completed routes region.

In some examples, the manual route start component 206 receives a selection of the second route identifier from the scheduled routes region. In response to receiving the selection of the second route identifier, the manual route start component 206 retrieves the first set of stops associated with the second route. The manual route start component 206 selects a given stop from the first set of stops in the GUI and displays a manually arrive option in response to selecting the given stop. The receiving of the request can include detecting selection of the manually arrive option.

In some examples, the manual route start component 206 receives a selection of the manually arrive option. In response to receiving the selection of the manually arrive option, the manual route start component 206 presents a prompt including a message that identifies the first route that is in the active route state and the second route that will be transitioned to the active route state. The manual route start component 206 can receive, via the prompt, input that confirms transition of the second route to the active route state. The input can include a selection of a confirm manual arrival option. In some cases, the manual route start component 206 identifies one or more stops of the first route that are incomplete and in response to identifying the one or more stops of the first route that are incomplete, indicates in the message that the one or more stops of the first route will be set to a skipped state in response to receiving the input that confirms the transition of the second route to the active route state. In such cases, the manual route start component 206 moves the second route identifier to the active routes region from the scheduled route region and moves the first route identifier from the active routes region to a completed routes region.

In some examples, the manual route start component 206, after transitioning the second route from the scheduled route state to the active route state, accesses a plurality of geofences associated with the first set of stops of the second route. The manual route start component 206 starts tracking the first set of stops. Namely, the manual route start component 206 automatically sets a given stop of the first set of stops to a completed state in response to detecting a current location of the vehicle within a geofence of the plurality of geofences associated with the given stop.

Figure 3:
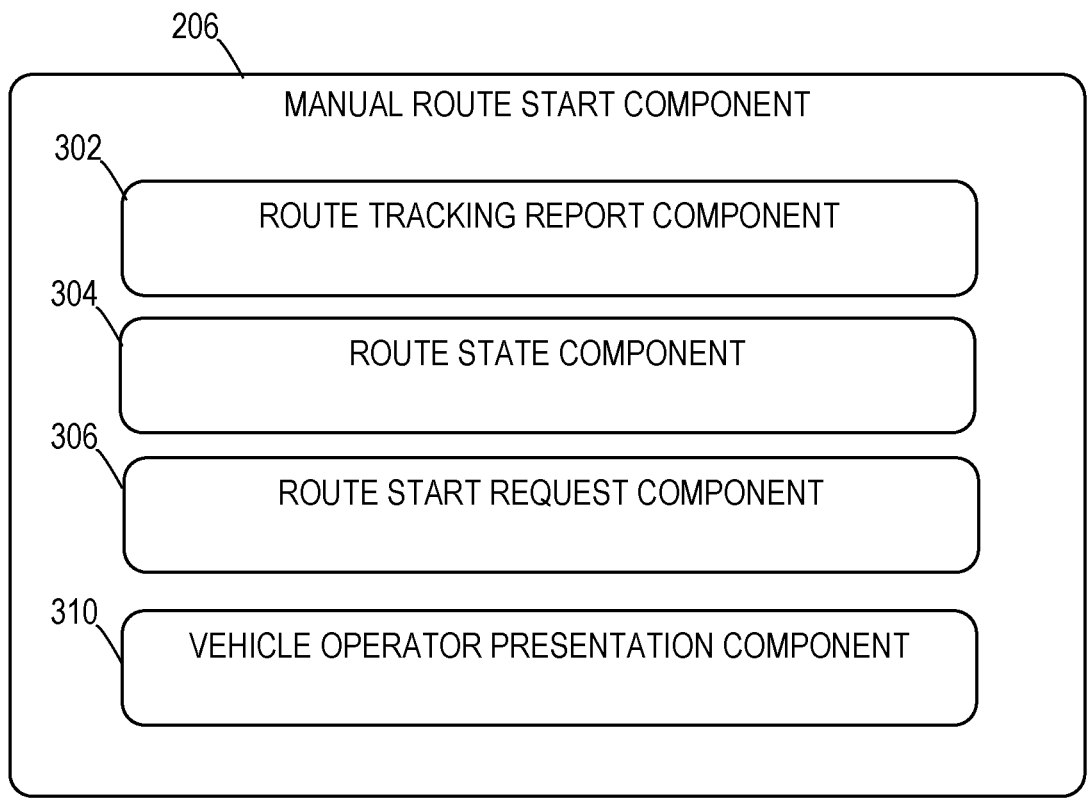
FIG. 3 is a block diagram of the manual route start component, according to some example embodiments.

As shown in FIG. 3, the manual route start component 206 may include a route tracking report component 302, a route state component 304, a route start request component 306, and a vehicle operator presentation component 310.

The route tracking report component 302 can communicate with the route tracking report generation component 208 to access and obtain route information (e.g., a route tracking report) for one or more current routes (routes that are being driven on a current day), one or more routes previously assigned and driven (e.g., routes that were previously assigned and completed or partially completed in a prior time period, such as 30 days prior to the current day), and one or more routes assigned to be driven in the future (e.g., routes that are assigned to be driven in a future time period, such as 30 days following the current day). The route information can include any of the route variables that form the route, such as the locations of the stops, the scheduled arrival/departure times of each stop, time to be spent at each stop, break times for a driver, and so forth.

The route tracking report component 302 can present a GUI to an operator or driver. The GUI can include several portions, such as a calendar portion to select a day for which to view assigned routes, a live or active routes portion in which one or more identifiers of a current set of routes that are being tracked are presented, a scheduled routes portion, which includes one or more identifiers of routes that will be driven in the future or later in the day, and/or a completed routes portion in which one or more identifiers of routes that have been at least partially completed or skipped are displayed.

The route tracking report component 302 can communicate with the route state component 304 to update the presentation of the route identifiers in the GUI. Specifically, the route state component 304 can determine which routes are currently active, scheduled, completed, and/or inactive. The route tracking report component 302 can retrieve a set of stops of each of the routes and can provide the set of stops and the identifiers to the route tracking report component 302. The route tracking report component 302 can perform some or all of the same operations as the route tracking report generation component 208 or other components used to track arrival/departure from stops. Based on the information obtained from the route tracking report component 302, the route state component 304 presents the identifiers of the routes in the corresponding portions of the GUI. For example, the route state component 304 can present a first identifier of a first route in a first portion of the display corresponding to active routes in response to determining that the first route is currently active. The route state component 304 can present a second identifier of a second route in a second portion of the display corresponding to scheduled routes in response to determining that the second route is currently scheduled or inactive.

The route start request component 306 can detect input from the user or a request from the user to manually start a particular route that is inactive or scheduled. For example, the route start request component 306 enables the driver or operator to select a new route to be in the active state and move the currently active route to the inactive state in various ways. In particular, the route start request component 306 can instruct the vehicle operator presentation component 310 to present a start route option together with the second route identifier that is displayed in the scheduled routes region. Responsive to detecting selection of the start route option, the route start request component 306 can instruct the vehicle operator presentation component 310 to present a confirmation screen or prompt informing the operator about the first route that is currently active (and the corresponding stops remaining on the first route) and informing the operator about the second scheduled route that has been selected to replace the currently active route. In response to receiving input from the operator confirming the operation to switch active routes, the route start request component 306 automatically transitions the first route to the completed or inactive route state and transitions the selected second route to the active route state.

In some examples, the route start request component 306 enables the operator to switch active routes by selecting a manually arrive option in association with a scheduled stop of a scheduled route. In particular, the route start request component 306 can receive input that selects the second identifier of the second route that is in the scheduled state. Responsive to the input, the route start request component 306 can instruct the vehicle operator presentation component 310 to present a set of scheduled stops associated with the second route. The route start request component 306 receives a selection of a given one of the scheduled stops and can present, in response, a manually arrive option. In response to receiving a selection of the manually arrive option, the route start request component 306 can set the given stop to the completed state and/or can instruct the vehicle operator presentation component 310 to provide a message or prompt with an option for the operator to confirm manual arrival at the given stop. In response to receiving the confirmation of the manual arrival option, the route start request component 306 can automatically transition the second route to the active route state and the first route to the completed or inactive route state. The route start request component 306 can cause the GUI to be presented by the route tracking report component 302 or can instruct the vehicle operator presentation component 310 to move the first identifier of the first route (that was previously active) to an inactive route region and to move the second identifier of the second route (that was previously scheduled) to the active route portion of the GUI. The message or prompt can inform the operator about which route is currently active (and the corresponding stops remaining on the current route) and which scheduled route has been selected to replace the currently active route.

Referring back to FIG. 2, the output component 210 provides the route tracking report to a fleet manager or other user. For example, the output component 210 may transmit the route tracking report to the client device 104 of a fleet manager or other user via email, text message, and the like. As another example, the output component 210 may provide the route tracking report within a user interface that can be accessed by a fleet manager. For example, a fleet manager may use a client device 104 to interact with the route management system 106 and to access the user interface provided by the output component 210.

The output component 210 may also transmit notifications based on the data included in a route tracking report. For example, the output component 210 may transmit a notification to a client device 104 of a vehicle operator indicating that the vehicle operator has missed a scheduled stop, is behind schedule, is not following the correct route, and the like. Similarly, the output component 210 may transmit a notification to a client device 104 of a fleet manager or other user to provide status updates associated with a route, such as the vehicle 102 having started at a route, arriving at a scheduled stop, left a scheduled stop, missed a scheduled stop, completed the route, and the like.

Figure 4:
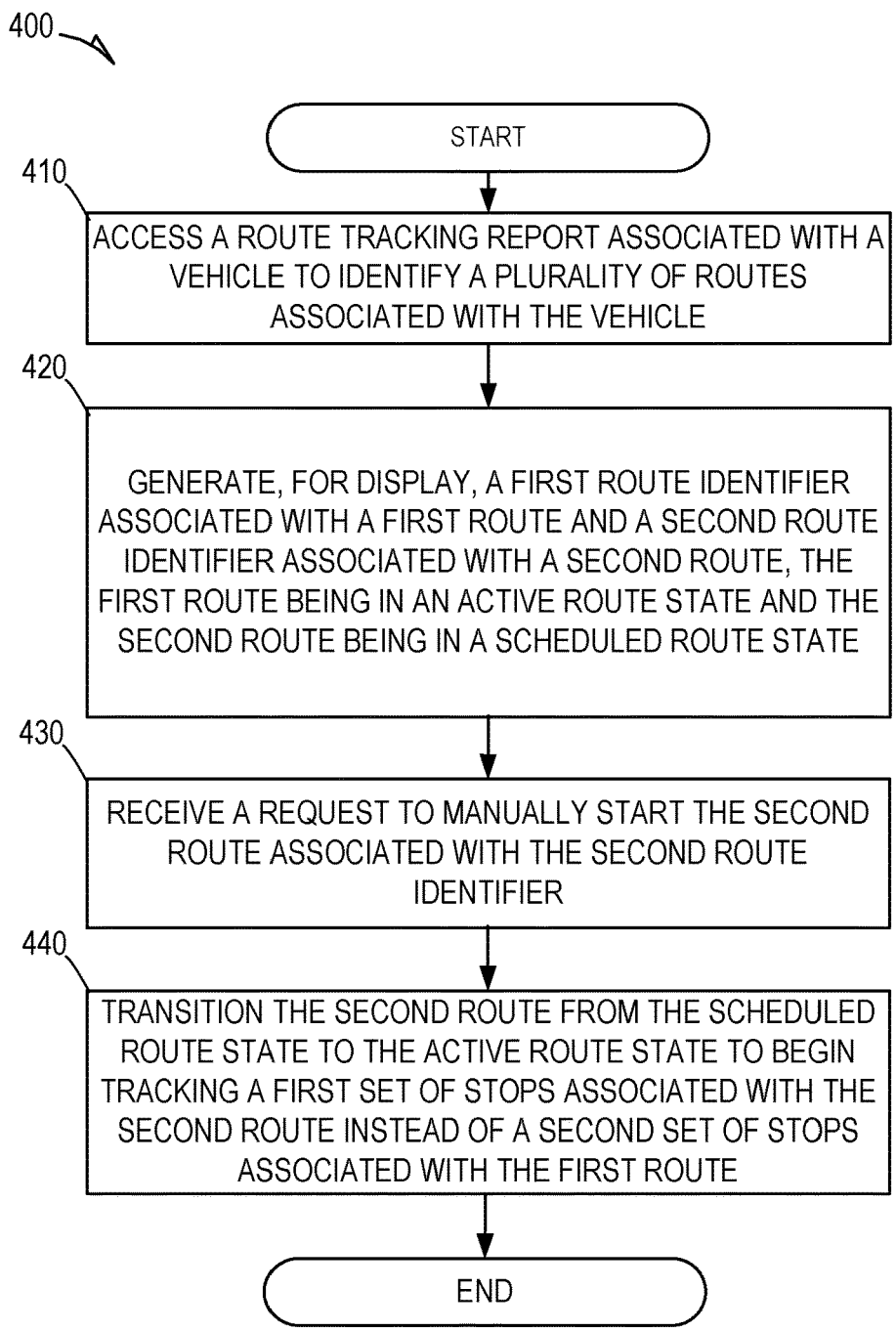
FIG. 4 is a flowchart showing a process for manually starting assigned routes, according to some example embodiments.

FIG. 4 is a flowchart showing a process 400 for manually starting assigned routes, according to some example embodiments. The process 400 may be embodied in computer-readable instructions for execution by one or more processors such that the operations of the process 400 may be performed in part or in whole by the route management system 106; accordingly, the process 400 is described below by way of example with reference thereto. However, it shall be appreciated that at least some of the operations of the process 400 may be deployed on various other hardware configurations and the process 400 is not intended to be limited to the route management system 106.

At operation 410, the route management system 106 accesses a route tracking report associated with a vehicle to identify a plurality of routes associated with the vehicle, as discussed above.

At operation 420, the route management system 106 generates, for display, a first route identifier associated with a first route and a second route identifier associated with a second route, the first route being in an active route state and the second route being in a scheduled route state, as discussed above.

At operation 430, the route management system 106 receives a request to manually start the second route associated with the second route identifier, as discussed above.

At operation 440, the route management system 106, in response to receiving the request, transitions the second route from the scheduled route state to the active route state to begin tracking a first set of stops associated with the second route instead of a second set of stops associated with the first route, as discussed above.

Figure 5:
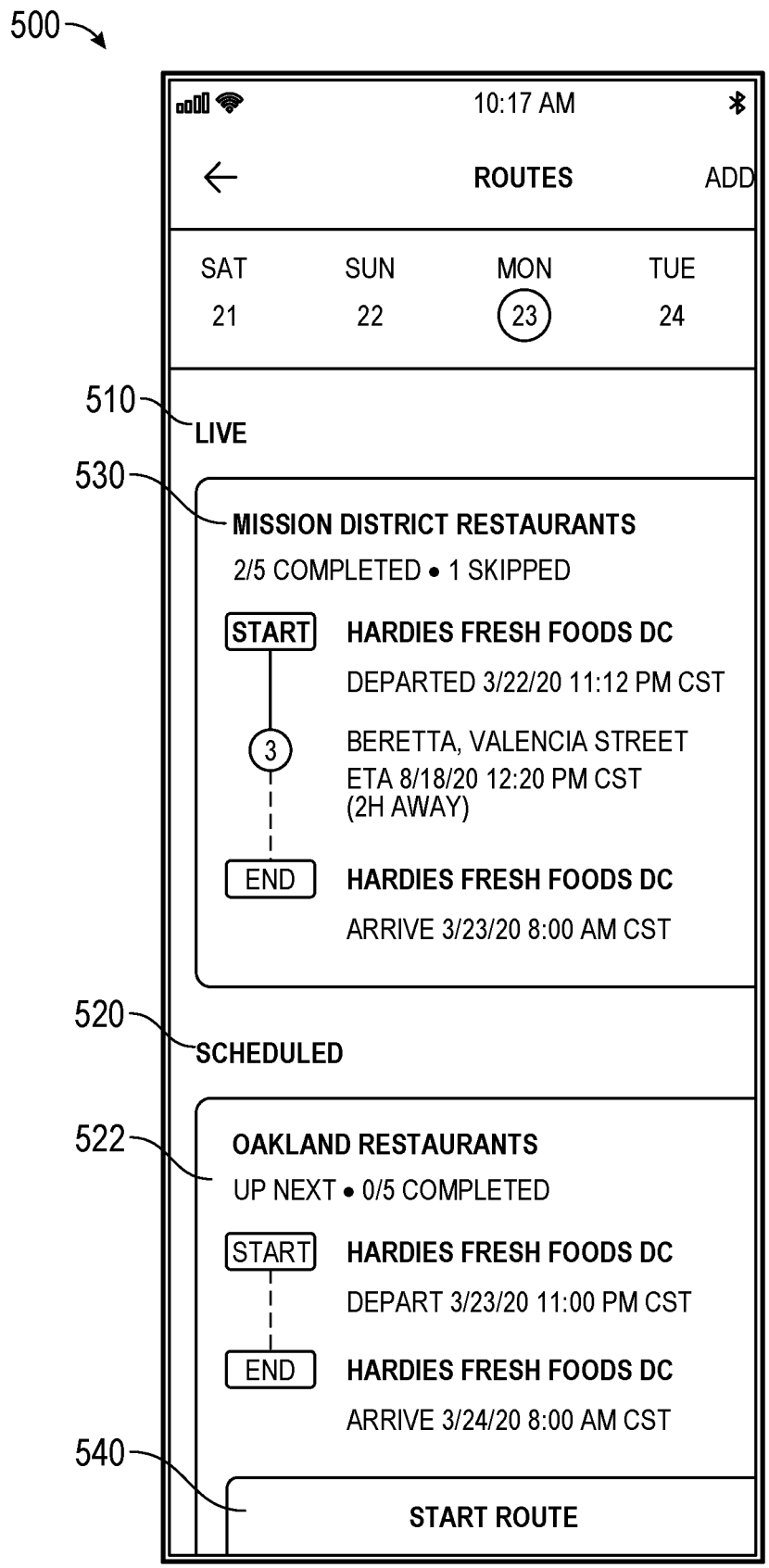
FIG. 5 is an example user interface for manually starting assigned routes, according to some example embodiments.

FIG. 5 is an example GUI 500 for manually starting assigned routes, according to some example embodiments. As shown in FIG. 5, the GUI 500 includes an active routes region 510 and a scheduled routes region 520. The active routes region 510 includes a first identifier 530 of a first route that is currently being tracked. Namely, as a result of the first route being currently tracked, one or more stops of the first route are automatically marked or set to a completed state when the geofence of the one or more stops is reached or broken by the current location of the vehicle 102 (e.g., when the current location of the vehicle 102 is detected to be within the geofence). The scheduled routes region 520 includes a second identifier 522 of a second route that is currently scheduled to be driven and tracked. Namely, as a result of the second route being currently scheduled, one or more stops of the second route are not automatically marked or set to a completed state when the geofence of the one or more stops is reached or broken by the current location of the vehicle 102.

The first identifier 530 can include a description of the first route, a total number of stops included in the first route, a description of each stop, an ETA of one or more stops, a number of stops that were skipped and a number of stops that remain to be completed. The second identifier 522 can include a description of the second route, a total number of stops included in the second route, a description of each stop, an ETA of one or more stops, and a number of stops that remain to be completed. The second identifier 522 can include a start route option 540. In cases where multiple route identifiers are included in the scheduled routes region 520, multiple start route options 540 can be displayed in association with each of the multiple route identifiers. This allows the driver to pick and choose which of the multiple scheduled routes to manually start.

Figure 6A:
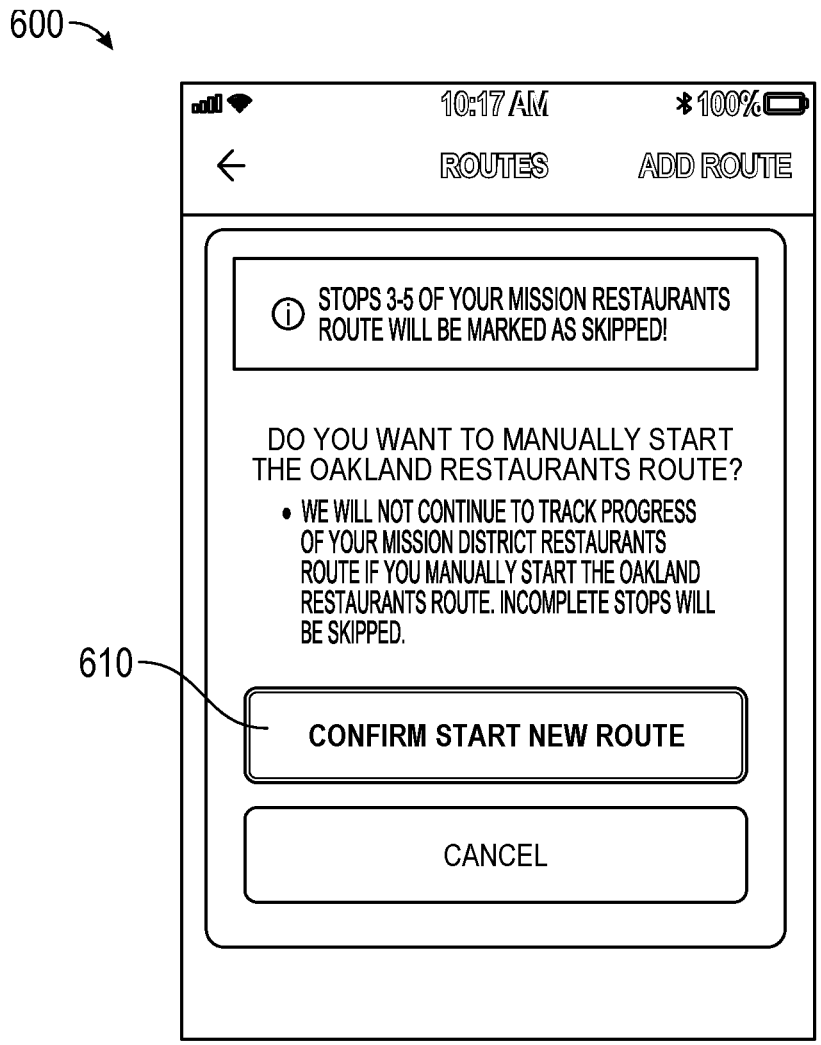
FIGS. 6A-6C are example user interfaces for manually starting assigned routes, according to some example embodiments.
Figure 6B:
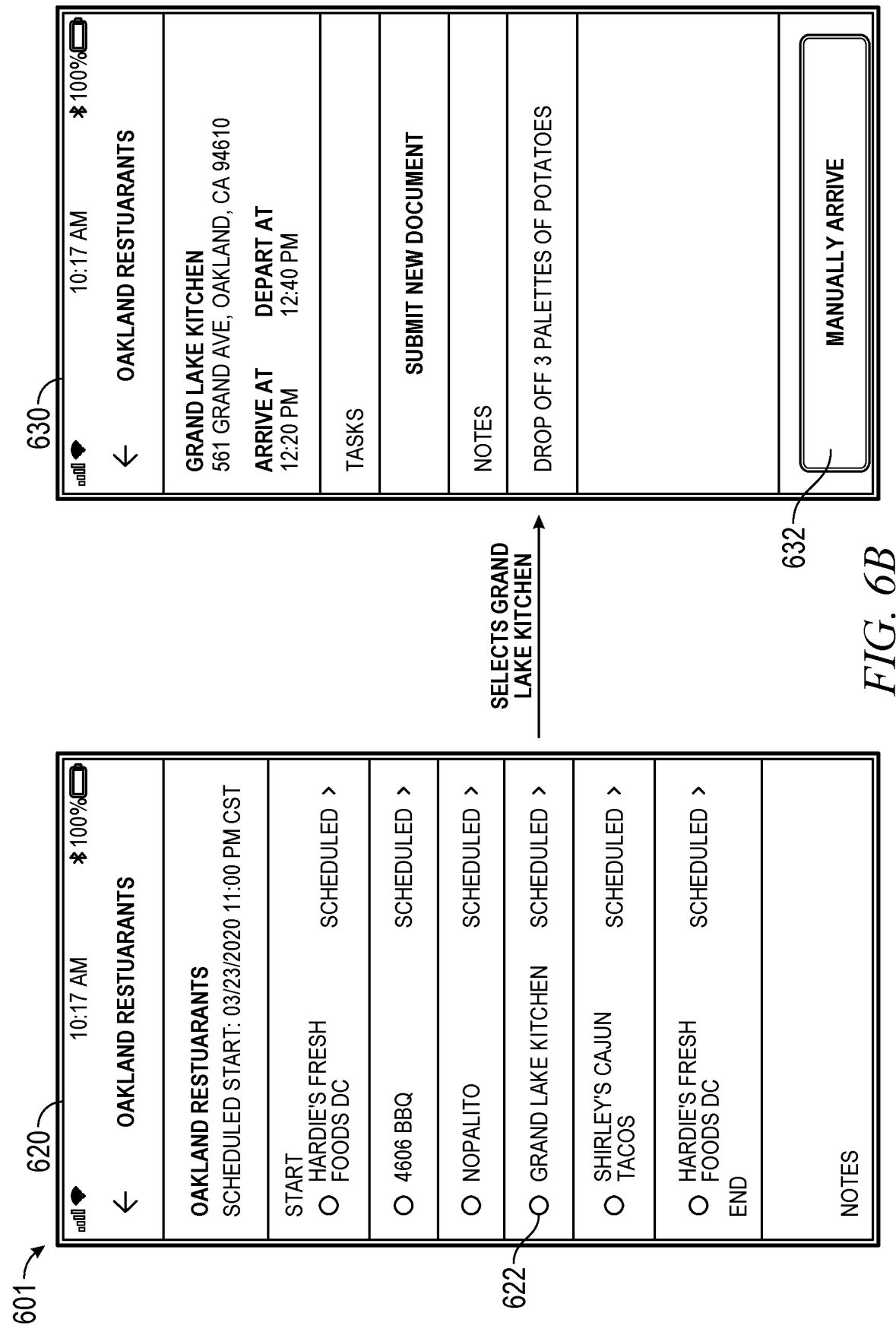

In response to receiving a selection of the start route option 540, a GUI 600, shown in FIG. 6A, is presented. The GUI 600 includes a prompt that indicates confirmation prompt informing the driver about the first route that is currently active (and the corresponding stops remaining on the current route) and informing the driver about the second route that has been selected to replace the currently active route. Specifically, the route management system 106 can determine how many stops remain in the first route and can present that quantity in the prompt shown in the GUI 600 along with a description of the first route. This alerts the driver about how many stops will be skipped and marked completed if the driver switches the active route for a different scheduled route.

Figure 7:
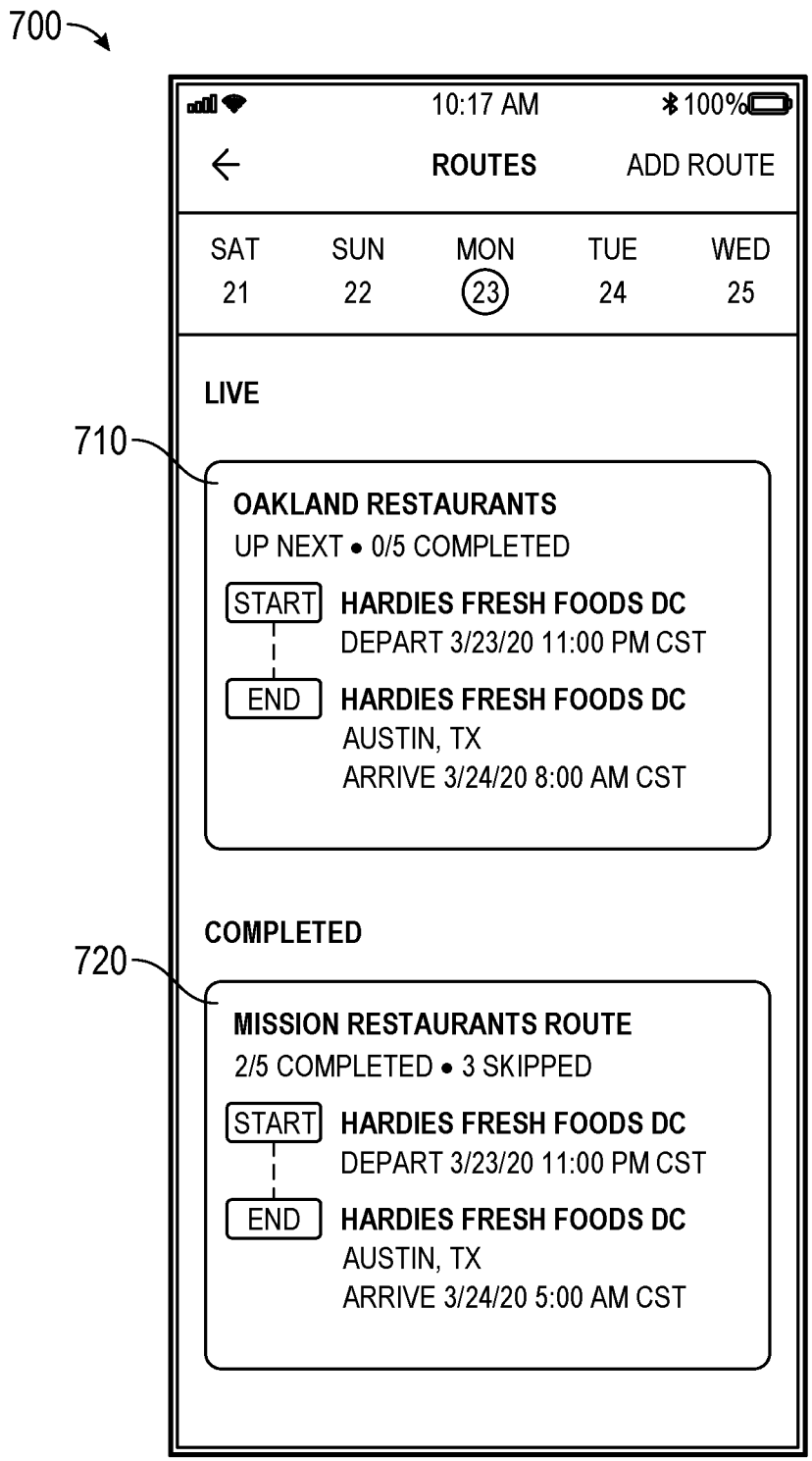
FIG. 7 is an example user interface for manually starting assigned routes, according to some example embodiments.

In response to receiving input from the operator confirming the operation to switch active routes, such as by selecting the confirm start new route option 610 from GUI 600, the route management system 106 automatically transitions the currently active route to the completed or inactive route state and transitions the selected scheduled route to the active route state. Specifically, as shown in FIG. 7, a GUI 700 is presented that is an updated version of the GUI 500. As shown in GUI 700, the first route identifier 720 has been moved to a completed routes portion and the second route identifier 710 has been moved to the active routes portion of the display. The first route identifier 720 is the same as the first identifier 530 (FIG. 5) but in an updated display position, and the second route identifier 710 is the same as the second identifier 522 (FIG. 5) but in an updated display position. Namely, in response to receiving selection of the confirm start new route option 610, the GUI 500 moves the first route identifier 720 to an inactive or completed routes portion of a display and marks or sets a remaining set of stops to be completed to the skipped state. Also, the GUI 500 moves the second route identifier 710 to the active state portion of the display and begins tracking stops along the second route associated with the second route identifier 710.

In some examples, the GUI 500 (FIG. 5) can receive input that selects the second identifier 522 associated with the second route. Responsive to the input, the GUI 500 can present a set of interfaces 601, shown in FIG. 6B, including a first GUI 620 in which a set of scheduled stops associated with the second route are displayed. The GUI 620 can receive a selection of a given stop 622 and can present, in response, a manually arrive option 632 in a GUI 630. This enables the driver to manually set a particular stop of a scheduled route to a completed state. This may be necessary because the scheduled route is not being tracked and, as a result, the current location of the vehicle 102 overlapping the geofence of the particular stop does not cause the particular stop to be automatically marked completed.

Figure 6C:
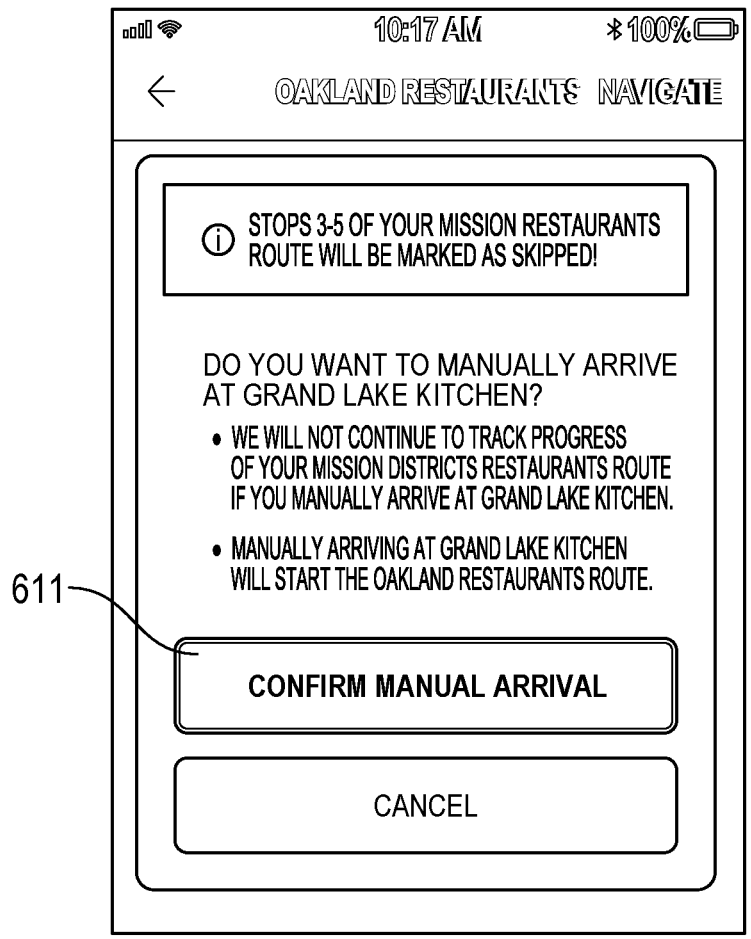

In response to receiving a selection of the manually arrive option 632, the GUI 630 can set the given stop 622 to the completed state and can provide a message or prompt, shown in the GUI 603 of FIG. 6C, with an option 611 for the operator to confirm manual arrival at the one or more of the set of scheduled stops. In response to receiving selection of the option 611 indicating the confirmation of the manual arrival, the GUI 603 can automatically transition the second route to the active route state and the first route to the completed or inactive route state. Similar to the prompt shown in GUI 600, the message or prompt of the GUI 603 can inform the operator about which route is currently active (and the corresponding stops remaining on the current route) and which scheduled route has been selected to replace the currently active route.

As shown in FIG. 7, the GUI 700 is presented that is an updated version of the GUI 500 in response to receiving selection of the option 611 indicating the confirmation of the manual arrival. As shown in GUI 700, the first route identifier 720 has been moved to a completed routes portion and the second route identifier 710 has been moved to the active routes portion of the display. The first route identifier 720 is the same as the first identifier 530 (FIG. 5) but in an updated display position, and the second route identifier 710 is the same as the second route identifier 522 (FIG. 5) but in an updated display position. Namely, in response to receiving selection of the confirm start new route option 610, the GUI 500 moves the first route identifier 720 to an inactive or completed routes portion of a display and marks or sets a remaining set of stops to be completed to the skipped state. Also, the GUI 500 moves the second route identifier 710 to the active state portion of the display and begins tracking stops along the second route associated with the second route identifier 710.

Software Architecture

Figure 8:
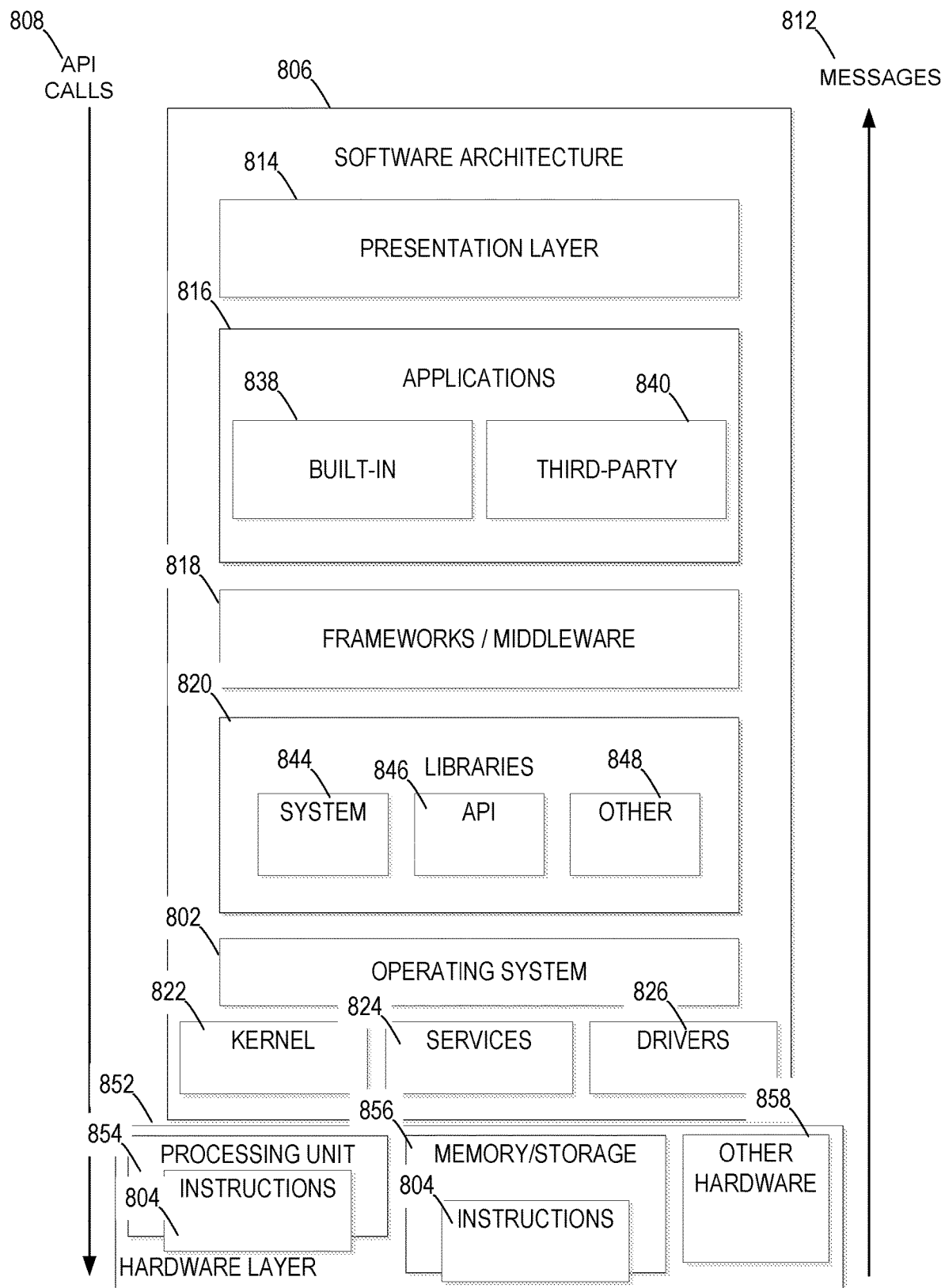
FIG. 8 is a block diagram illustrating an example software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke application programming interface (API) calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
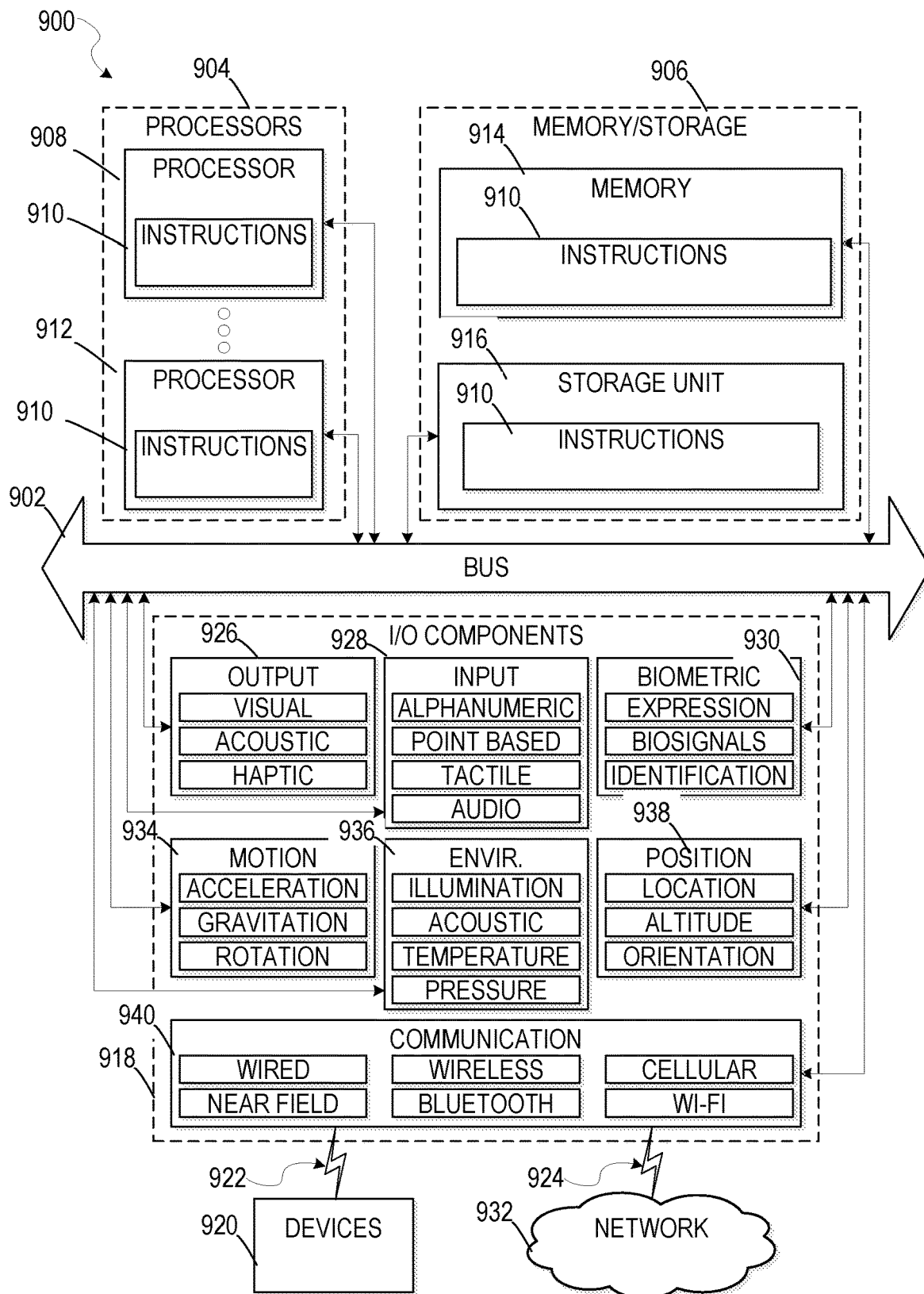
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor 904) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 904 may further be a multi-core processor having two or more independent processors 904 (sometimes referred to as "cores") that may execute instructions 910 contemporaneously.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
accessing sensor data associated with a vehicle to determine a current location of the vehicle and motion of the vehicle;
communicating the sensor data to a route management system to cause the route management system to automatically generate a route tracking report for the vehicle based on the current location and motion of the vehicle and one or more route variables defining an assigned route, the route tracking report describing tracked movement of the vehicle in relation to the assigned route;
accessing the route tracking report to identify a plurality of routes associated with the vehicle;
displaying, in a graphical user interface, a first route identifier associated with a first route and a second route identifier associated with a second route, the first route being in an active route state and the second route being in a scheduled route state;
receiving, via the graphical user interface, a request to manually start the second route associated with the second route identifier;
in response to receiving the request, transitioning the second route from the scheduled route state to the active route state and the first route to a completed route state to begin automatically tracking a first set of stops associated with the second route instead of a second set of stops associated with the first route by processing location data received from a location sensor associated with the vehicle, the first set of stops associated with the second route having a same stop as the second set of stops associated with the first route;
detecting, based on the location data received from the location sensor, that the vehicle has arrived at the same stop that is associated with both the first route and the second route;
setting the same stop to a completed state in the second route while maintaining the same stop in a scheduled state in the first route in response to detecting, based on the location data received from the location sensor, that the vehicle has arrived at the same stop and in response to determining that the second route is in the active route state; and
displaying, in the graphical user interface, the first route identifier in a completed routes region while the first route is in the completed route state simultaneously with presenting the second route identifier in an active routes region while the second route is in the active route state, the completed routes region configured to present a plurality of identifiers of routes that have at least partially been completed or skipped.

2. The method of claim 1, further comprising:
presenting, as part of the first route identifier, a first total number of stops included in the first route and a first number of stops that remain to be completed for the first route; and
presenting, as part of the second route identifier, a second total number of stops included in the second route and a second number of stops that remain to be completed for the second route.

3. The method of claim 1, further comprising:
displaying, in the graphical user interface together with the completed routes region and the active routes region, a plurality of time period options;
receiving input that selects an individual time period option from the plurality of displayed plurality of time period options;
in response to receiving the input that selects the individual time period option, retrieving a first set of routes that correspond to the first time period option to update routes presented in at least one of the completed routes region, active routes region, or a scheduled routes region.

4. The method of claim 3, further comprising:
determining that a current location of the vehicle has simultaneously entered two geofences, the two geofences comprising a first geofence associated with a first stop of the second set of stops of the first route and a second geofence associated with a second stop of the first set of stops of the second route;
in response to determining that the current location of the vehicle has simultaneously entered the two geofences, identifying which of the first and second routes is currently in the active route state; and setting the first stop to a completed state and maintaining the second stop in a scheduled state in response to determining that the first route is in the active route state.

5. The method of claim 1, further comprising:
displaying a graphical user interface (GUI) comprising the active routes region and a scheduled routes region, the first route identifier being displayed in the active routes region while the first route is in the active route state, the second route identifier being displayed in the scheduled routes region while the second route is in the scheduled route state.

6. The method of claim 5, further comprising:
displaying a start route option in a portion of the scheduled routes region associated with the second route, wherein receiving the request comprises detecting selection of the start route option.

7. The method of claim 6, further comprising:
in response to receiving the request, presenting a prompt comprising a message that identifies the first route that is in the active route state and the second route that will be transitioned to the active route state; and
receiving, via the prompt, input that confirms transition of the second route to the active route state, the input comprising a selection of a start new route option.

8. The method of claim 7, further comprising:
identifying one or more stops of the first route that are incomplete; and
in response to identifying the one or more stops of the first route that are incomplete, indicating in the message that the one or more stops of the first route will be set to a skipped state in response to receiving the input that confirms the transition of the second route to the active route state.

9. The method of claim 7, further comprising, in response to receiving the input:
moving the second route identifier to the active routes region from the scheduled routes region; and
moving the first route identifier from the active routes region to the completed routes region.

10. The method of claim 5, further comprising:
receiving a selection of the second route identifier from the scheduled routes region;
in response to receiving the selection of the second route identifier, retrieving the first set of stops associated with the second route; and
displaying the first set of stops in the GUI.

11. The method of claim 10, further comprising:
selecting a given stop from the first set of stops in the GUI; and
displaying a manually arrive option in response to selecting the given stop, wherein receiving the request comprises detecting selection of the manually arrive option.

12. The method of claim 11, further comprising:
receiving a selection of the manually arrive option; and
in response to receiving the selection of the manually arrive option:
presenting a prompt comprising a message that identifies the first route that is in the active route state and the second route that will be transitioned to the active route state; and
receiving, via the prompt, input that confirms transition of the second route to the active route state, the input comprising a selection of a confirm manual arrival option.

13. The method of claim 12, further comprising:
identifying one or more stops of the first route that are incomplete; and
in response to identifying the one or more stops of the first route that are incomplete, indicating in the message that the one or more stops of the first route will be set to a skipped state in response to receiving the input that confirms the transition of the second route to the active route state.

14. The method of claim 12, further comprising:
moving the second route identifier to the active routes region from the scheduled routes region; and
moving the first route identifier from the active routes region to the completed routes region.

15. The method of claim 1, further comprising:
after transitioning the second route from the scheduled route state to the active route state, accessing a plurality of geofences associated with the first set of stops of the second route;
automatically setting a given stop of the first set of stops to a completed state in response to detecting, based on real time information of the sensor data, that the current location of the vehicle has entered a geofence of the plurality of geofences associated with the given stop, wherein the sensor data comprises location data received from the location sensor that describes the current location and motion of the vehicle; and
preventing tracking of stops associated with routes in the scheduled route state while tracking stops for the second route in the active route state to reduce system resource usage.

16. A route management system comprising:
one or more computer processors; and
one or more non-transitory computer-readable mediums storing instructions that, when executed by the one or more computer processors, cause the route management system to perform operations comprising:
accessing sensor data associated with a vehicle to determine a current location of the vehicle and motion of the vehicle;
communicating the sensor data to the route management system to cause the route management system to automatically generate a route tracking report for the vehicle based on the current location and motion of the vehicle and one or more route variables defining an assigned route, the route tracking report describing tracked movement of the vehicle in relation to the assigned route;
accessing the route tracking report to identify a plurality of routes associated with the vehicle;
displaying, in a graphical user interface, a first route identifier associated with a first route and a second route identifier associated with a second route, the first route being in an active route state and the second route being in a scheduled route state;
receiving, via the graphical user interface, a request to manually start the second route associated with the second route identifier;
in response to receiving the request, transitioning the second route from the scheduled route state to the active route state and the first route to a completed route state to begin automatically tracking a first set of stops associated with the second route instead of a second set of stops associated with the first route by processing location data received from a location sensor associated with the vehicle, the first set of stops associated with the second route having a same stop as the second set of stops associated with the first route;

detecting, based on the location data received from the location sensor, that the vehicle has arrived at the same stop that is associated with both the first route and the second route;

setting the same stop to a completed state in the second route while maintaining the same stop in a scheduled state in the first route in response to detecting, based on the location data received from the location sensor, that the vehicle has arrived at the same stop and in response to determining that the second route is in the active route state; and displaying, in the graphical user interface, the first route identifier in a completed routes region while the first route is in the completed route state simultaneously with presenting the second route identifier in an active routes region while the second route is in the active route state, the completed routes region configured to present a plurality of identifiers of routes that have at least partially been completed or skipped.

17. The route management system of claim 16, the operations further comprising:

presenting, as part of the first route identifier, a first total number of stops included in the first route and a first number of stops that remain to be completed for the first route; and presenting, as part of the second route identifier, a second total number of stops included in the second route and a second number of stops that remain to be completed for the second route.

18. The route management system of claim 16, the operations further comprising:

displaying, in the graphical user interface together with the completed routes region and the active routes region, a plurality of time period options;

receiving input that selects an individual time period option from the plurality of displayed plurality of time period options;

in response to receiving the input that selects the individual time period option, retrieving a first set of routes that correspond to the first time period option to update routes presented in at least one of the completed routes region, active routes region, or a scheduled routes region.

19. The route management system of claim 18, the operations further comprising:

determining that a current location of the vehicle has simultaneously entered two geofences, the two geofences comprising a first geofence associated with a first stop of the second set of stops of the first route and a second geofence associated with a second stop of the first set of stops of the second route;

in response to determining that the current location of the vehicle has simultaneously entered the two geofences, identifying which of the first and second routes is currently in the active route state; and setting the first stop to a completed state and maintaining the second stop in a scheduled state in response to determining that the first route is in the active route state.

20. A non-transitory computer-readable medium storing instructions that, when executed by one or more computer processors of a route management system, cause the route management system to perform operations comprising:

accessing sensor data associated with a vehicle to determine a current location of the vehicle and motion of the vehicle;

communicating the sensor data to the route management system to cause the route management system to automatically generate a route tracking report for the vehicle based on the current location and motion of the vehicle and one or more route variables defining an assigned route, the route tracking report describing tracked movement of the vehicle in relation to the assigned route;

accessing the route tracking report to identify a plurality of routes associated with the vehicle;

displaying, in a graphical user interface, a first route identifier associated with a first route and a second route identifier associated with a second route, the first route being in an active route state and the second route being in a scheduled route state;

receiving, via the graphical user interface, a request to manually start the second route associated with the second route identifier;

in response to receiving the request, transitioning the second route from the scheduled route state to the active route state and the first route to a completed route state to begin automatically tracking a first set of stops associated with the second route instead of a second set of stops associated with the first route by processing location data received from a location sensor associated with the vehicle, the first set of stops associated with the second route having a same stop as the second set of stops associated with the first route;

detecting, based on the location data received from the location sensor, that the vehicle has arrived at the same stop that is associated with both the first route and the second route;

setting the same stop to a completed state in the second route while maintaining the same stop in a scheduled state in the first route in response to detecting, based on the location data received from the location sensor, that the vehicle has arrived at the same stop and in response to determining that the second route is in the active route state; and displaying, in the graphical user interface, the first route identifier in a completed routes region while the first route is in the completed route state simultaneously with presenting the second route identifier in an active routes region while the second route is in the active route state, the completed routes region configured to present a plurality of identifiers of routes that have at least partially been completed or skipped.

* * * * *